United States Patent
Li et al.

(10) Patent No.: US 11,138,441 B2
(45) Date of Patent: Oct. 5, 2021

(54) VIDEO ACTION SEGMENTATION BY MIXED TEMPORAL DOMAIN ADAPTION

(71) Applicant: Baidu USA, LLC, Sunnyvale, CA (US)

(72) Inventors: Baopu Li, Santa Clara, CA (US);
Min-Hung Chen, San Jose, CA (US);
Yingze Bao, Mountain View, CA (US)

(73) Assignee: Baidu USA LLC, Sunnyvale, CA (US)

( * ) Notice: Subject to any disclaimer, the term of this patent is extended or adjusted under 35 U.S.C. 154(b) by 117 days.

(21) Appl. No.: 16/706,590

(22) Filed: Dec. 6, 2019

(65) Prior Publication Data

US 2021/0174093 A1    Jun. 10, 2021

(51) Int. Cl.
*G06K 9/62* (2006.01)
*G06K 9/00* (2006.01)
(Continued)

(52) U.S. Cl.
CPC ..... *G06K 9/00765* (2013.01); *G06K 9/00718* (2013.01); *G06K 9/00744* (2013.01);
(Continued)

(58) Field of Classification Search
CPC .......... C08L 5/08; A61L 24/043; A61L 24/08; A61L 26/0023; A61L 26/0052; A61L 2300/406; A61L 2400/06; A61L 24/0015; A61L 24/0031; A61L 26/0066; A61L 26/008; A61K 31/437; A61K 31/717; A61K 31/728; A61K 47/34; A61K 47/38; A61K 9/0019; A61K 9/06; A61P 41/00
See application file for complete search history.

(56) References Cited

U.S. PATENT DOCUMENTS

| | | | |
|---|---|---|---|
| 2005/0033758 A1* | 2/2005 | Baxter | G11B 27/28 |
| 2011/0034562 A1* | 2/2011 | Regan | A61K 9/0019 |
| | | | 514/648 |

(Continued)

OTHER PUBLICATIONS

Ganin et al.,"Domain-Adversarial Training of Neural Networks," arXiv preprint arXiv:1505.07818, 2016. (35pgs).

(Continued)

*Primary Examiner* — Xin Jia
(74) *Attorney, Agent, or Firm* — North Weber & Baugh LLP

(57) ABSTRACT

Embodiments herein treat the action segmentation as a domain adaption (DA) problem and reduce the domain discrepancy by performing unsupervised DA with auxiliary unlabeled videos. In one or more embodiments, to reduce domain discrepancy for both the spatial and temporal directions, embodiments of a Mixed Temporal Domain Adaptation (MTDA) approach are presented to jointly align frame-level and video-level embedded feature spaces across domains, and, in one or more embodiments, further integrate with a domain attention mechanism to focus on aligning the frame-level features with higher domain discrepancy, leading to more effective domain adaptation. Comprehensive experiment results validate that embodiments outperform previous state-of-the-art methods. Embodiments can adapt models effectively by using auxiliary unlabeled videos, leading to further applications of large-scale problems, such as video surveillance and human activity analysis.

20 Claims, 10 Drawing Sheets

(51) Int. Cl.
  *G06N 3/04* (2006.01)
  *G06N 3/08* (2006.01)
(52) U.S. Cl.
  CPC ........... *G06K 9/6262* (2013.01); *G06N 3/049* (2013.01); *G06N 3/08* (2013.01)

(56) References Cited

U.S. PATENT DOCUMENTS

| | | | |
|---|---|---|---|
| 2019/0309079 A1* | 10/2019 | Gromada | A61K 39/3955 |
| 2020/0202119 A1* | 6/2020 | Wang | G06K 9/00711 |
| 2021/0058582 A1* | 2/2021 | Aubie | H04N 21/440227 |

OTHER PUBLICATIONS

Goodfellow et al.,"Generative Adversarial Nets," arXiv preprint arXiv:1406.2661, 2014. (9pgs).
Jamal et al.,"Deep Domain Adaptation in Action Space," In British Machine Vision Conference (BMVC), 2018. (13pgs).
Kuehne et al.,"The Language of Actions:Recovering the Syntax and Semantics of Goal-Directed Human Activities," In IEEE Conference on Computer Vision and Pattern Recognition (CVPR), 2014. (8pgs).
Kuehne et al.,"An end-to-end generative framework for video segmentation and recognition," arXiv preprint arXiv:1509.01947, 2016. (8pgs).
Kuehne et al.,"Weakly supervised learning of actions from transcripts," arXiv preprint arXiv:1610.02237, 2017. (33pgs).
Lea et al.,"Temporal Convolutional Networksfor Action Segmentation and Detection," arXiv preprint arXiv:1611.05267, 2016. (10pgs).
Lea et al.,"Segmental spatiotemporal cnns for fine-grained action segmentation," arXiv preprint arXiv:1602.02995, 2016. (17pgs).
Lei et al.,"Temporal Deformable Residual Networks for Action Segmentation in Videos," In IEEE Conference on Computer Vision and Pattern Recognition (CVPR), 2018. (10pgs).
Carreira et al.,"Quo Vadis, Action Recognition? A New Model and the Kinetics Dataset," arXiv preprint arXiv:1705.07750, 2018. (10pgs).
Chen et al.,"Temporal Attentive Alignment for Large-Scale Video Domain Adaptation," arXiv preprint arXiv:1907.12743, 2019. (16pgs).
G.Csurka,"A Comprehensive Survey on Domain Adaptation for Visual Applications," In Domain Adaptation in Computer Vision Applications, (Abstract Only) Springer, 2017. (1pg).
Ding et al.,"TricorNet: A Hybrid Temporal Convolutional andRecurrent Network for Video Action Segmentation," arXiv preprint arXiv:1705.07818, 2017. (10pgs).
Ding et al.,"Weakly-Supervised Action Segmentation withIterative Soft Boundary Assignment," arXiv preprint arXiv:1803.10699, 2018. (9pgs).
Donahue et al.,"DeCAF: A Deep Convolutional Activation Featurefor Generic Visual Recognition," arXiv preprint arXiv:1310.1531, 2013. (10pgs).
Farha et al.,"MS-TCN: Multi-Stage Temporal Convolutional Network for ActionSegmentation," arXiv preprint arXiv:1903.01945, 2019. (10pgs).
Fathi et al.,"Learning to Recognize Objects in Egocentric Activities," In IEEE Conference on Computer Vision and Pattern Recognition (CVPR), 2011. (8pgs).
Gammulle et al.,"Coupled Generative Adversarial Network for Continuous Fine-grained ActionSegmentation," arXiv preprint arXiv:1909.09283, 2019. (10pgs).
Ganin et al.,"Unsupervised Domain Adaptation by Backpropagation," arXiv preprint arXiv:1409.7495, 2015. (11pgs).
Li et al.,"Adaptive batch normalization for practical domain adaptation," Pattern Recognition, 80:109-117, 2018. (9 pgs).
Li et al.,"Revisiting batch normalization for practical domain adaptation," arXiv preprint arXiv:1603.04779, 2016. (12pgs).
Long et al.,"Learning transferable features with deep adaptation networks," arXiv preprint arXiv:1502.02791, 2015. (9pgs).
Long et al.,"Unsupervised Domain Adaptation with ResidualTransfer Networks," arXiv preprint arXiv:1602.04433, 2017. (9pgs).
Long et al.,"Deep transfer learning with joint adaptation networks," arXiv preprint arXiv:1605.06636, 2017. (10pgs).
Ma et al.,"TS-LSTM and Temporal-Inception:Exploiting Spatiotemporal Dynamics for Activity Recognition," arXiv preprint arXiv:1703.10667, 2017. (16pgs).
Ma et al.,"Attend and Interact: Higher-Order Object Interactions for Video Understanding," arXiv preprint arXiv:1711.06330, 2018. (18pgs).
Newell et al.,"Stacked Hourglass Networks forHuman Pose Estimation," arXiv preprint arXiv:1603.06937, 2016. (17pgs).
Oord et al.,"Wavenet: A generative model for raw audio," arXiv preprint arXiv:1609.03499, 2016. (15pgs).
Pan et al.,"A survey on transfer learning," IEEE Transactions on Knowledge and Data Engineering (TKDE), 22(10):1345-1359, 2010. (15 pgs).
Paszke et al.,"Automatic differentiation in PyTorch," In Advances in Neural Information Processing Systems Workshop (NIPSW), 2017. (4pgs).
Richard et al.,"Temporal action detection using a statistical language model," In IEEE Conference on Computer Vision and Pattern Recognition (CVPR), 2016. (10pgs).
Richard et al.,"Weakly supervised action learning with rnn based fine-to-coarse modeling," arXiv preprint arXiv:1703.08132, 2017. (10pgs).
Saito et al.,"Maximum classifier discrepancy for unsupervised domain adaptation," arXiv preprint arXiv:1712.02560, 2018. (12pgs).
Singh et al.,"A Multi-Stream Bi-Directional Recurrent Neural Network for Fine-GrainedAction Detection," In IEEE Conference on Computer Vision & Pattern Recognition (CVPR), 2016. (10pgs).
Stein et al.,"Combining embedded accelerometers with computer vision for recognizing food preparation activities," In ACM international joint conference on Pervasive and ubiquitous computing (UbiComp), 2013. (10pgs).
Sultani et al.,"Human action recognition across datasets by foreground-weighted histogram decomposition," In IEEE conference on Computer Vision and Pattern Recognition (CVPR), 2014. (8pgs).
Sun et al.,"Deep CORAL: Correlation Alignment for DeepDomain Adaptation," arXiv preprint arXiv:1607.01719, 2016. (7pgs).
Tran et al.,"Learning Spatiotemporal Features with 3D Convolutional Networks," arXiv preprint arXiv:1412.0767, 2015. (16pgs).
Tzeng et al.,"Adversarial discriminative domain adaptation," arXiv preprint arXiv:1702.05464, 2017. (10pgs).
Wang et al.,"Non-local Neural Networks," arXiv preprint arXiv:1711.07971, 2018. (10pgs).
Wang et al.,"Transferable Attention for Domain Adaptation," In AAAI Conference on Artificial Intelligence (AAAI), 2019. (8pgs).
Wei et al.,"Convolutional Pose Machines," arXiv preprint arXiv:1602.00134, 2016. (9pgs).
Xu et al.,"Dual many-to-one-encoder-based transfer learning for cross-dataset human action recognition," Image and Vision Computing, (Abstract Only) 2016. (2pgs).
Yan et al.,"Mind the class weight bias: Weighted maximum mean discrepancy for unsupervised domain adaptation," arXiv preprint arXiv:1705.00609, 2017. (10pgs).
Zellinger et al.,"Central moment discrepancy (cmd) for domain-invariant representation learning," arXiv preprint arXiv:1702.08811, 2019. (13pgs).
Zhang et al.,"Collaborative and adversarial network for unsupervised domain adaptation," In IEEE Conference on Computer Vision and Pattern Recognition (CVPR), 2018. (9pgs).

* cited by examiner

600

```
┌─────────────────────────────────────────────────────┐
│ Input, for each input video from a first set (e.g., │
│ source) of video data and from a second set (e.g.,  │
│ target) of video data, a set of frame-level         │
│ features of frames of the input video into a video  │── 605
│ segmentation network that includes at least one     │
│ domain adaption temporal convolution network        │
└─────────────────────────────────────────────────────┘
                          │
                          ▼
┌─────────────────────────────────────────────────────┐
│ Output, for each input video, a final set of        │
│ frame-level predictions in which each frame of at   │
│ least some of the frames from a set of frames of    │── 610
│ the input video has an associated label prediction  │
└─────────────────────────────────────────────────────┘
                          │
                          ▼
┌─────────────────────────────────────────────────────┐
│ Determine one or more losses for the video          │── 615
│ segmentation network                                │
└─────────────────────────────────────────────────────┘
                          │
                          ▼
┌─────────────────────────────────────────────────────┐
│ Update the video segmentation network using one or  │── 620
│ more of the losses                                  │
└─────────────────────────────────────────────────────┘
```

Input video into a trained video segmentation system that includes at least one domain adaption temporal convolution network that has been trained using with a local adversarial domain classifier and a global adversarial domain classifier ⌐ 805

Output a final set of frame-level predictions in which each frame of at least some of the frames of the input video is assigned a label ⌐ 810

FIG. 8

VIDEO ACTION SEGMENTATION BY MIXED TEMPORAL DOMAIN ADAPTION

BACKGROUND

A. Technical Field

The present disclosure relates generally to systems and methods for computer learning that can provide improved computer performance, features, and uses. More particularly, the present disclosure relates to systems and methods for video action segmentation.

B. Background

Video action segmentation is significant for a wide range of applications, including video surveillance and analysis of human activities. Given a video, the typical goal is to simultaneously segment the video by time and predict each segment with a corresponding action category. While video classification has shown great progress given the recent success of deep neural networks, temporally locating and recognizing action segments in long untrimmed videos is still challenging.

Action segmentation approaches may be factorized into extracting low-level features using convolutional neural networks and applying high-level temporal models. Encouraged by the advances in speech synthesis, recent approaches rely on temporal convolutions to capture long range dependencies across frames using a hierarchy of temporal convolutional filters.

Despite the success of these temporal models, the performance gains come from densely annotated data for fully supervised learning. Since manually annotating precise frame-by-frame actions is both extremely time-consuming and quite challenging, these methods are not easy to extend to larger scale for real world applications. Therefore, there is increasing attention on utilizing auxiliary data, which is somewhat easier to obtain, to alleviate this problem. For example, some researchers use action transcripts to get prior knowledge of the ordering of action occurrence. However, even in these auxiliary data cases, the amount of data can be limited.

Accordingly, what is needed are systems and methods for video action segmentation using unlabeled data.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 6 depicts a methodology for training a mixed temporal domain adaptive (MTDA) network/video segmentation network, according to embodiments of the present disclosure.

FIG. 8 depicts a methodology for using a trained MTDA/video segmentation system for video action prediction inference, according to embodiments of the present disclosure.

DETAILED DESCRIPTION OF EMBODIMENTS

Figure 1:
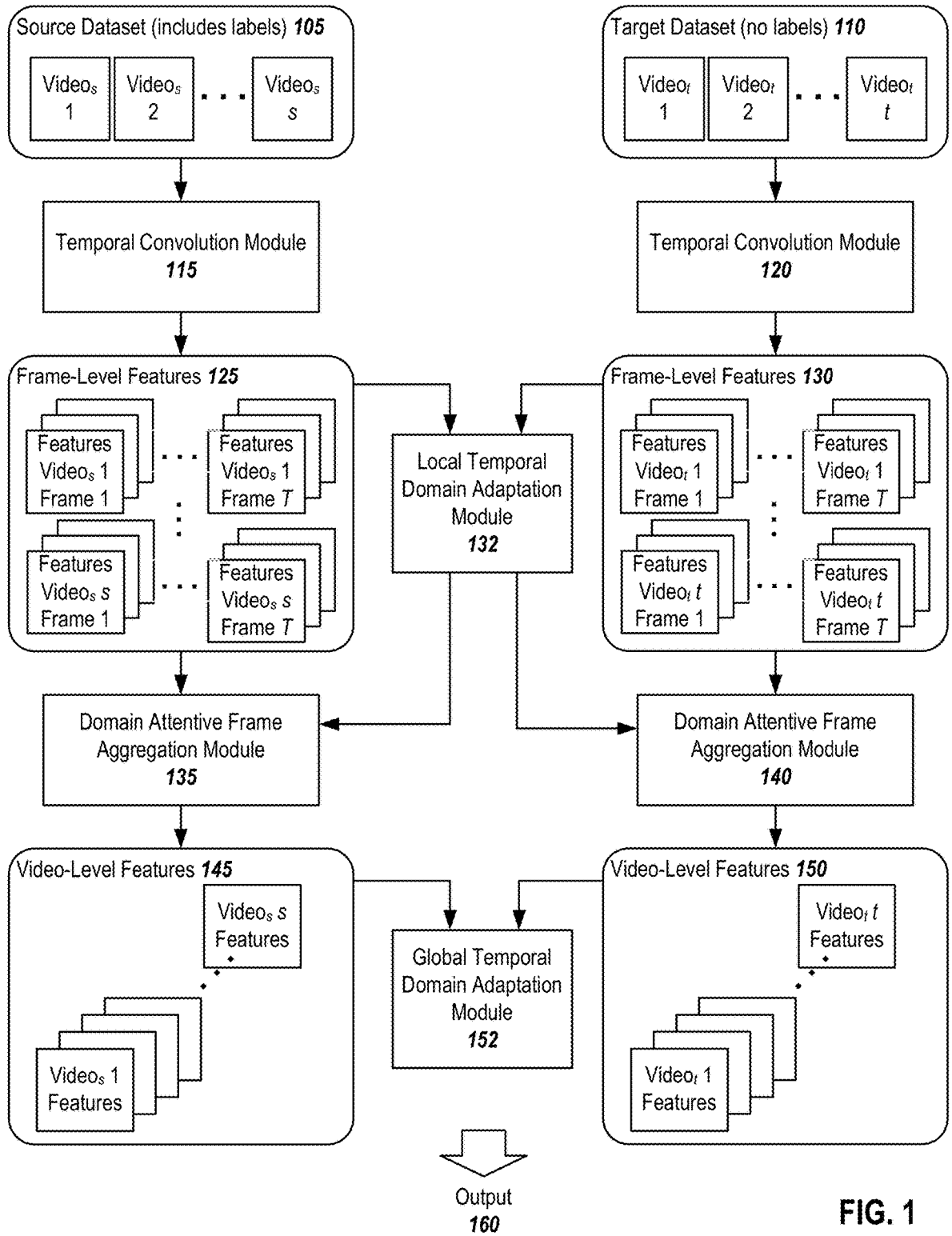
FIG. 1 depicts an overview of a mixed temporal domain adaptation (MTDA) approach for video segmentation, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state.

Any headings used herein are for organizational purposes only and shall not be used to limit the scope of the description or the claims. Each reference/document mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. General Introduction

In one or more embodiments herein, action segmentation is regarded as a domain adaptation (DA) problem given the observation that a main challenge is the distributional discrepancy caused by spatiotemporal variations across domains. For example, different people (which may also be referred to as subjects) may perform the same action with different styles in terms of spatial locations and temporal duration. The variations in the background environment may also contribute to the overall domain discrepancy. To solve the domain discrepancy issues, embodiments herein utilize auxiliary unlabeled videos, which are much easier to obtain.

As noted above, videos can suffer from domain discrepancy along the spatial direction, the temporal direction, or both, bringing the need of alignment for embedded feature spaces along both directions. However, most DA approaches have been developed only for images and not videos. Therefore, presented herein are Mixed Temporal Domain Adaptation (MTDA) embodiments to jointly align frame-level and video-level embedded feature spaces across domains. FIG. 1 depicts an overview of Mixed Temporal Domain Adaptation (MTDA) system and approach for video segmentation, according to embodiments of the present disclosure. Embodiments may be further integrated with a domain attention mechanism to focus on aligning the frame-level features with higher domain discrepancy, leading to more effective domain adaptation.

FIG. 1 graphically depicts an overview of a Mixed Temporal Domain Adaptation (MTDA) implementation 100 for action segmentation, according to embodiments of the present disclosure. The source dataset 105 refers to video data with labels, and the target dataset 110 refers to video data without labels (or without using labels). As depicts, local temporal features (e.g., frame-level features 125 and 130) are extracted using temporal convolution (e.g., temporal convolution modules 115 and 120). Then, global temporal features (e.g., video-level features 145 and 150) are obtained with domain attentive frame aggregation (e.g., domain attentive frame aggregation module 135 and 140). It should be noted that the temporal convolution modules 115 and 120 may be the same module for both the source dataset and the target dataset. Similarly, the domain attentive frame aggregation module 135 and 140 may be the same module for both the source dataset and the target dataset. Finally, domain discrepancies are diminished by jointly performing local and global temporal domain adaptation (e.g., local temporal domain adaptation module 132 and global temporal domain adaptation module 152). In one or more embodiments, the system 100 outputs (160) a classification label for a set of frames for a video. In one or more embodiments, during the training phase, the output classification labels for the source dataset videos are compared to the ground truth labels for the source dataset 105 to obtain prediction loss, which is used to update the system 100. In embodiments, other losses may also be used when training the system.

Embodiments were tested on three datasets with high spatiotemporal domain discrepancy: Dataset A, Dataset B, and Dataset C, and achieved new state-of-the-art performance on all three datasets. Since embodiments herein can adapt a model trained in one environment to new environments using only unlabeled videos without additional manual annotation, it is applicable to large-scale real-world scenarios, such as video surveillance.

Some of the contributions include, but are not limited to:

1. Local Temporal Domain Adaptation: Embodiments of an effective adversarial-based DA methodology to learn domain-invariant frame-level features are presented herein. To the authors' knowledge, this is the first work to utilize unlabeled videos as auxiliary data to diminish spatiotemporal variations for action segmentation.

2. Mixed Temporal Domain Adaptation (MTDA): In one or more embodiments, the local and global embedded feature spaces are jointly aligned across domains by integrating an additional DA mechanism embodiment, which aligns the video-level feature spaces. Furthermore, the domain attention mechanism embodiment may be integrated to aggregate domain-specific frames to form global video representations, leading to more effective domain adaptation.

3. Experiments and Analyses: Evaluations were performed on three challenging real-world datasets, which found that embodiments of the present disclosure outperform all the previous state-of-the-art methods. Analysis and ablation study were also performed on different design choices to identify contributions of various components.

B. Relate Work

In this section, some of the most recent work for action segmentation are reviewed, including the fully-supervised and weakly-supervised setting. Also discussed below are some of the most related domain adaptation work for images and videos.

1. Action Segmentation

Encouraged by the advances in speech synthesis, recent approaches rely on temporal convolutions to capture long-range dependencies across frames using a hierarchy of temporal convolutional filters. Encoder-Decoder Temporal Convolutional Networks (ED-TCN) (C. Lea, M. D. Flynn, R. Vidal, A. Reiter, and G. D. Hager, "Temporal convolutional networks for action segmentation and detection," in *IEEE Conference on Computer Vision and Pattern Recognition (CVPR)*, 2017) follows an encoder-decoder architecture with a temporal convolution and pooling in the encoder, and upsampling followed by deconvolution in the decoder. TricorNet (L. Ding and C. Xu, "Tricornet: A hybrid temporal convolutional and recurrent network for video action segmentation," arXiv preprint arXiv:1705.07818, 2017) replaces the convolutional decoder in the ED-TCN with a bi-directional LSTM (Bi-LSTM). TDRN (P. Lei and S. Todorovic, "Temporal deformable residual networks for action segmentation in videos," in *IEEE Conference on Computer Vision and Pattern Recognition (CVPR)*, 2018) builds on top of ED-TCN and use deformable convolutions instead of the normal convolution and add a residual stream to the encoder-decoder model. MS-TCN (Y. A. Farha and J. Gall, "MS-TCN: Multi-Stage Temporal Convolutional Network for Action Segmentation," in *IEEE Conference on Computer Vision and Pattern Recognition (CVPR)*, 2019) stacks multiple stages of temporal convolutional network (TCN) where each TCN comprises multiple temporal convolutional layers performing a causal dilated one-dimensional (1D) convolution. With the multi-stage architecture, each stage takes an initial prediction from the previous stage and refines it. Embodiments herein utilize aspects of the MS-TCN but add a focus on developing methods to effectively exploit unlabeled videos instead of modifying the architecture. Because of the difficulty of dense annotation, there is increasing attention on the weakly-supervised setting by utilizing auxiliary data to mitigate this problem. HTK (H. Kuehne, A. Richard, and J. Gall, "Weakly supervised learning of actions from transcripts," *Computer Vision and Image Understanding (CVIU)*, 163:78-89, 2017) and GRU (A. Richard, H. Kuehne, and J. Gall, "Weakly supervised action learning with RNN based fine-to-coarse modeling," in *IEEE Conference on Computer Vision and Pattern Recognition (CVPR)*, 2017) train the models in an iterative procedure starting from a linear alignment based on auxiliary video transcripts. TCFPN (L. Ding and C. Xu, "Weakly-supervised action segmentation with iterative soft boundary assignment," in *IEEE Conference on Computer Vision and Pattern Recognition (CVPR)*, 2018) further improves the performance with a temporal convolutional feature pyramid network and a soft labeling mechanism at the boundaries. In contrast to these approaches, unlabeled videos are exploited, which are easy to obtain, instead of video transcripts.

2. Domain Adaptation

Most recent DA approaches are based on deep learning architectures designed for addressing the domain shift problems given the fact that the deep CNN features without any DA method have been shown to outperform traditional DA methods using hand-crafted features. Most DA methods follow the two-branch (source and target) architecture and aim to find a common feature space between the source and target domains. The models are therefore optimized with a combination of classification and domain losses. One of the main classes of methods used is discrepancy-based DA, whose metrics are designed to measure the distance between source and target feature distributions, including variations of maximum mean discrepancy (MMD) and the CORrelation ALignment (CORAL) function. By diminishing the distance of distributions, discrepancy-based DA methods reduce the gap across domains. Another method, adversarial-based DA, adopts a similar concept as Generative Adversarial Networks (GANs) by integrating domain discriminators into the architectures. Through the adversarial objectives, the discriminators are optimized to classify different domains, while the feature extractors are optimized in the opposite direction. Adversarial Discriminative Domain Adaptation (ADDA) (E. Tzeng, J. Hoffman, K. Saenko, and T. Darrell, "Adversarial Discriminative Domain Adaptation," in *IEEE Conference on Computer Vision and Pattern Recognition (CVPR)*, 2017) uses an inverted label GAN loss to split the optimization into two parts: one for the discriminator and the other for the generator. In contrast, the gradient reversal layer (GRL) is adopted in some works to invert the gradients so that the discriminator and generator are optimized simultaneously. Recently, Transferable Attention for Domain Adaptation (TADA) (X. Wang, L. Li, W. Ye, M. Long, and J. Wang, "Transferable Attention For Domain Adaptation," in *AAAI Conference on Artificial Intelligence (AAAI)*, 2019) adopts an attention mechanism to adapt the transferable regions and images.

3. Domain Adaptation for Action

Unlike image-based DA, video-based DA is still an under-explored area. A few works focus on small-scale video DA with only few overlapping categories. W. Sultani and I. Saleemi ("Human action recognition across datasets by foreground-weighted histogram decomposition," in *IEEE conference on Computer Vision and Pattern Recognition (CVPR)*, 2014) improved the domain generalizability by decreasing the effect of the background. T. Xu, F. Zhu, E. K. Wong, and Y. Fang ("Dual Many-To-One-Encoder-Based Transfer Learning For Cross-Dataset Human Action Recognition," *Image and Vision Computing*, 55:127-137, 2016) mapped source and target features to a common feature space using shallow neural networks. Action Modeling on Latent Subspace (AMLS) (A. Jamal, V. P. Namboodiri, D. Deodhare, and K. Venkatesh, "Deep Domain Adaptation In Action Space," in British Machine Vision Conference (BMVC), 2018) adapted pre-extracted C3D (Convolutional 3D) (D. Tran, L. Bourdev, R. Fergus, L. Torresani, and M. Paluri, "Learning spatiotemporal features with 3D convolutional networks," in *IEEE International Conference on Computer Vision (ICCV)*, 2015) features on a Grassmann manifold obtained using PCA. However, the datasets used in the above works are too small to have enough domain shift to evaluate DA performance. Recently, Chen et al. (M.-H. Chen, Z. Kira, G. AlRegib, J. Woo, R. Chen, and J. Zheng, "Temporal Attentive Alignment for Large-Scale Video Domain Adaptation," in *IEEE International Conference on Computer Vision (ICCV)*, 2019) proposed two larger cross-domain datasets for action recognition and the state-of-the-art approach TA$_3$N. However, these works focus only on the classification task while embodiments herein address the more challenging temporal segmentation task.

C. Embodiments of Video Action Segmentation

An embodiment of a baseline model is first introduced, which is related to a current state-of-the-art approach for action segmentation, Multi-Stage Temporal Convolution Network (MS-TCN) (Section C.1). Then, embodiments of how unlabeled video is incorporated to align frame-level feature spaces are presented in Section C.2. Finally, in Section C.3, embodiments of a methodology with attention-based video-level domain adaptation are presented.

1. Embodiments of a Temporal Convolutional Network (TCN) and Multi-Stage Temporal Convolution Network (MS-TCN)

Figure 2:
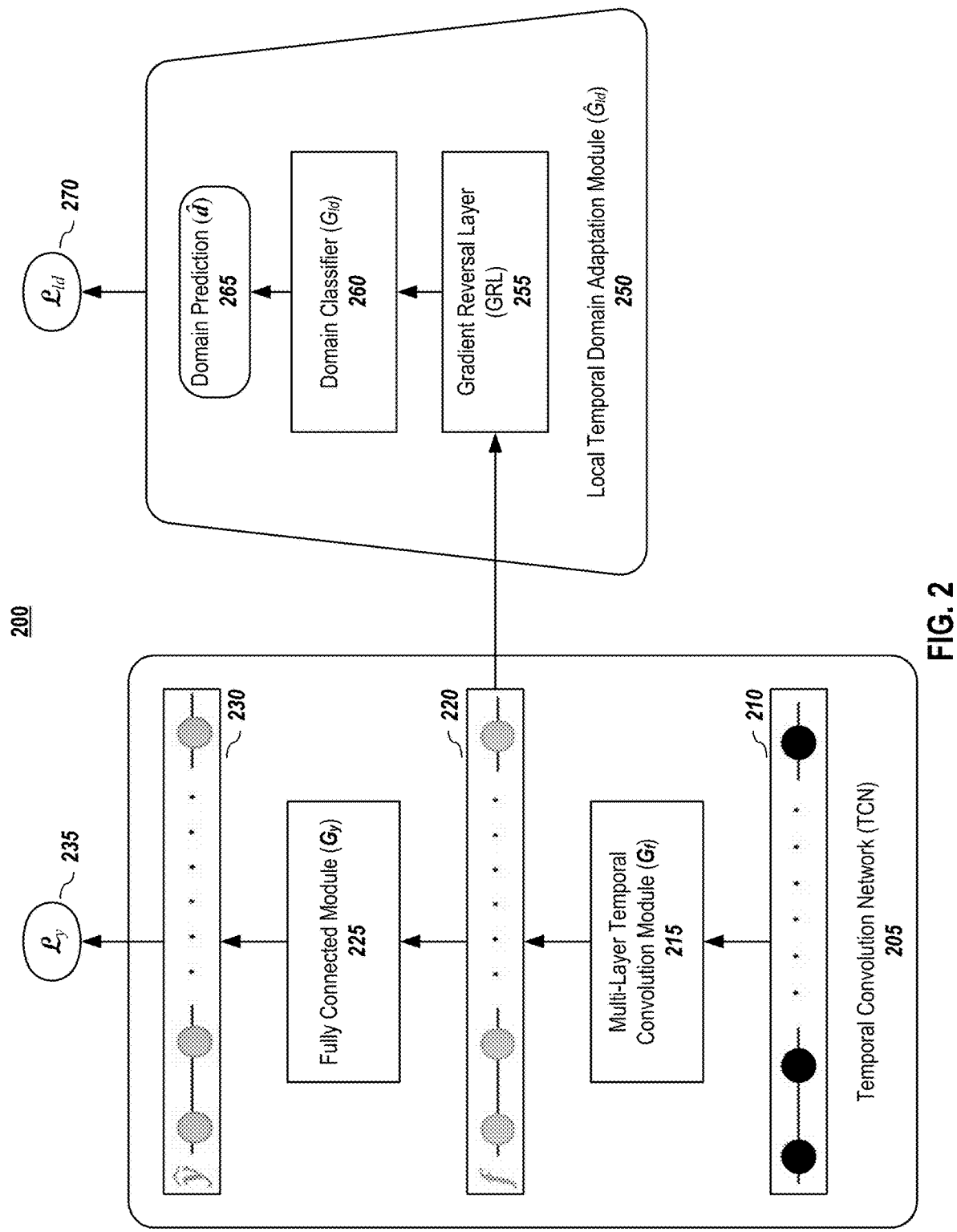
FIG. 2 depicts a view of domain adaptive temporal convolutional network (DA-TCN) comprising a single-stage temporal convolutional network (TCN) and local temporal domain adaptor (LT-DA), according to embodiments of the present disclosure.

In one or more embodiments, a basic component of a baseline model embodiment is a temporal convolutional network (TCN) 205, as shown in FIG. 2. FIG. 2 depicts a domain adaptive temporal convolutional network (DA-TCN) comprising a temporal convolutional network (TCN) 205 and a local temporal domain adaptor (LT-DA) 250, according to embodiments of the present disclosure. As discussed below, a DA-TCN may include additional components not depicted in the embodiment shown in FIG. 2.

In one or more embodiments, a TCN module 205 comprises multiple temporal convolutional layers 215 performing a causal dilated 1D convolution. Dilated convolution is used to increase the temporal receptive field exponentially without the need to increase the number of parameters, which can prevent the model from over-fitting the training data. In one or more embodiments, several domain adaptive temporal convolutional networks, or different embodiments thereof, are stacked to form a multi-stage TCN (MS-TCN). For example, in one or more embodiments, the first one or more stages may be DA-TCN modules that effectively just comprise a TCN module 205, then the next stage or stages may be DA-TCN embodiments that include more modules, such as a TCN, a local temporal domain adaptor (LT-DA) 250, a global temporal domain adaptor (discussed below), other components such as one or more attentive modules, or a combination thereof. Thus, in embodiments, a TCN module may be considered an embodiment of a DA-TCN. In one or more embodiments, each stage takes the prediction from the previous stage and utilizes the multi-layer temporal convolution feature generator $G_f$ 215 to obtain the frame-level features $f=\{f_1, f_2, \ldots f_T\}$ 220, in which $f_t$ represents a frame-level feature, and then converts them into the frame-level predictions $\hat{y}=\{\hat{y}_1, \hat{y}_2, \ldots \hat{y}_T\}$ 230 by a fully-connected layer $G_y$ 225.

In one or more embodiments, an overall prediction loss function 235 for each TCN stage is a combination of a classification loss and a smoothing loss, which may be expressed as follows:

$$\mathcal{L}_y = \mathcal{L}_{cls} + \alpha \mathcal{L}_{T\text{-}MSE} \tag{1}$$

where $\mathcal{L}_{cls}$ is a cross-entropy loss and $\mathcal{L}_{T\text{-}MSE}$ is a truncated mean squared error used to reduce the difference between adjacent frame-level prediction to improve the smoothness, and α is the trade-off weight for the smoothness loss. To train the complete model, in one or more embodiments, the sum of the losses over all stages are minimized.

2. Embodiments of Local Temporal Domain Adaptation

Despite the progress of MS-TCN on action segmentation, there is still a room for improvement. A main challenge is the distributional discrepancy caused by spatio-temporal variations across domains. For example, different subjects may perform the same action completely different due to personalized spatio-temporal styles. Therefore, generalizing the model across domains is an issue. In embodiments herein, the domain discrepancy is reduced by performing unsupervised DA with auxiliary unlabeled videos.

To implement adversarial-based DA, in one or more embodiments, for each stage, the frame-level features f 220 are fed into an additional shallow binary classifier, called the local domain classifier $G_{ld}$ 260, to discriminate whether the data is from the source or target domain. In one or more embodiments, the local domain classifier comprises one or more fully connected layers and a binary classification layer that outputs whether the video is from the source dataset or the target dataset. In one or more embodiments, these operations may be performed by a local temporal domain adaptor (LT-DA).

The domain adaptive temporal convolutional network 200 embodiment depicted in FIG. 2 includes an embodiment of a local temporal domain adaptor (LT-DA) 250. As noted above, in one or more embodiments, local temporal domain adaptation may be performed by applying a domain classifier $G_{ld}$ 260 to the final embedded features f 220 in one stage. In one or more embodiments, a gradient reversal layer (GRL) 255 is added between the domain classifier $G_{ld}$ 260 and f 220 so that f may be trained to be domain-invariant. $\hat{y}$ 230 is the frame-level predictions for each stage, and $\mathcal{L}_y$ 235 and $\mathcal{L}_{ld}$ 270 are the prediction loss, which uses the ground truth data for the source data, and local domain loss, respectively.

Before backpropagating the gradients to the main model, the gradient reversal layer (GRL) 255 is inserted between $G_{ld}$ 260 and the TCN model 205 to invert the gradient, as shown in FIG. 2. During adversarial training, $G_f$ 215 is learned by maximizing the domain discrimination loss $\mathcal{L}_{ld}$, while $G_{ld}$ 260 is learned by minimizing $\mathcal{L}_{ld}$ with the domain label d (i.e., whether the video is a source video or target video). Therefore, the feature generator $G_f$ will be optimized to gradually align the feature distributions between the two domains.

In one or more embodiments, the adversarial local domain classifier $G_{ld}$ is a combination of the GRL 255 and the domain classifier $G_{ld}$ 260. The integration of $G_{ld}$ for different stages was investigated. From experiments, in one or more embodiments, it was found using DA-TCN modules that included $G_{ld}$ modules in the middle stages (e.g., stages 2 and 3 of a four-stage system) produced better performance.

In one or more embodiments, the overall loss function of the network 200 is a combination of the baseline prediction loss $\mathcal{L}_y$ 235 and the local domain loss $\mathcal{L}_{ld}$ 270, which may be expressed as follows:

$$\mathcal{L} = \sum^{N_s} \mathcal{L}_y - \sum^{\tilde{N}_s} \beta_l \mathcal{L}_{ld} \tag{2}$$

$$\mathcal{L}_{ld} = \frac{1}{T} \sum_{j=1}^{T} L_{ld}(G_{ld}(f_j), d_j) \tag{3}$$

where Ns is the total stage number, $\tilde{N}_s$ is the number of selected stages, and T is the number of frames from each video. $\mathcal{L}_{ld}$ is a binary cross entropy loss function, and $\beta_l$ is a trade-off weight for local domain loss $\mathcal{L}_{ld}$. In one or more embodiments, $\beta_l$ is a floating number from 0 to 1.

Figure 5:
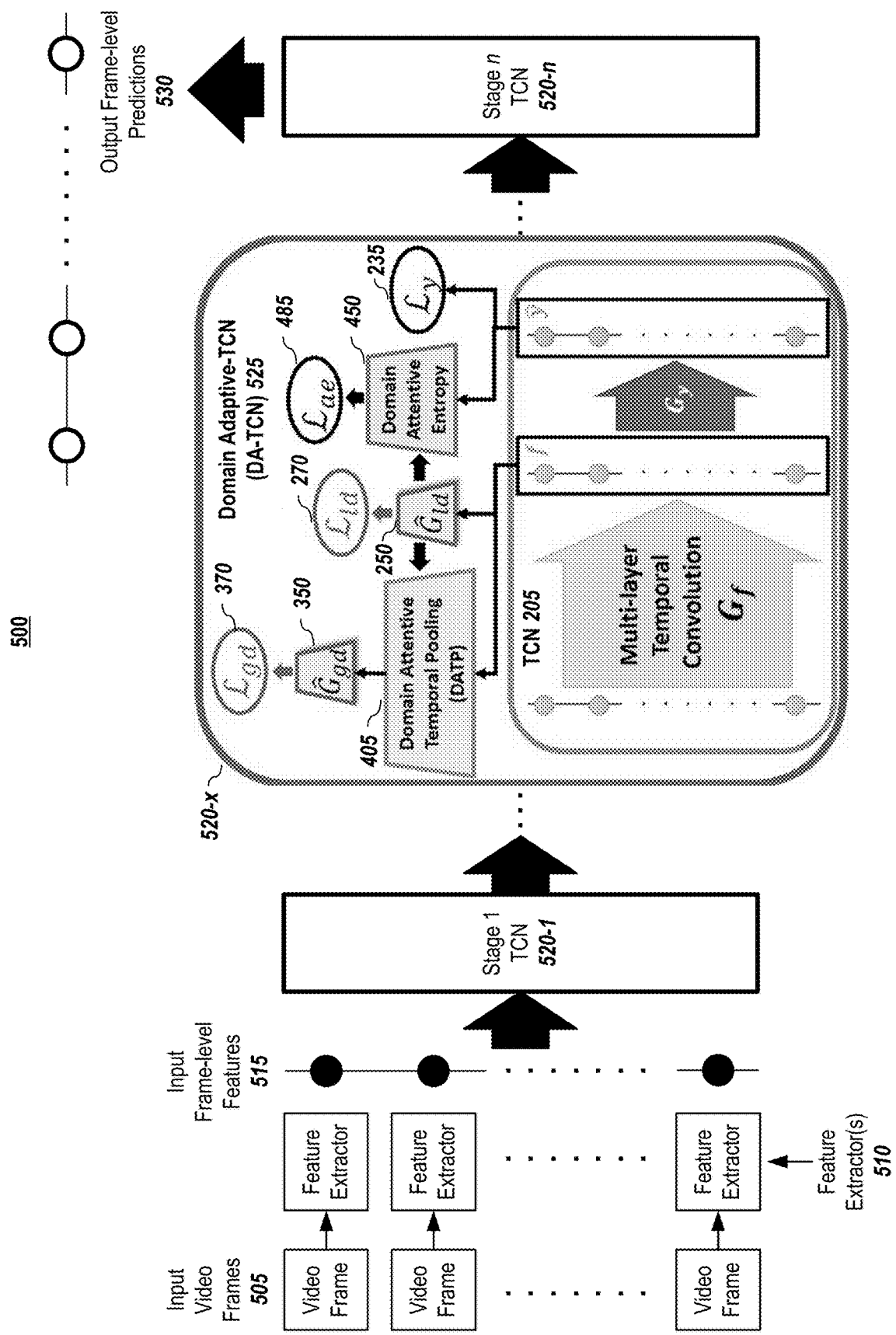
FIG. 5 depicts an overall architecture of a mixed temporal domain adaptive system, according to embodiments of the present disclosure.

3. Embodiments of Mixed Temporal Domain Adaptation (MTDA)/Video Segmentation System A drawback of integrating DA into local frame level features f is that the video-level feature space is still not fully aligned. Although f is learned using the context and dependencies from neighbor frames, the temporal receptive field is still not guaranteed to cover the whole video length. Furthermore, aligning video-level feature spaces also helps to generate domain-adaptive frame-level predictions for action segmentation. Therefore, embodiments include jointly aligning local frame-level feature spaces and global video-level feature spaces. FIG. 5, which will be discussed in more detail below, depicts an example embodiment that jointly aligns local frame-level feature spaces and global video-level feature spaces.

a) Global Temporal Domain Adaptation Embodiments (i) Temporal Pooling Embodiments To achieve this goal of jointly aligning local frame-level feature spaces and global video-level feature spaces, in one or more embodiments, the frame-level features $f=\{f_1, f_2, \ldots f_T\}$ are aggregated using temporal pooling to form video-level feature V. Since each feature $f_t$ captures context in different time by temporal convolution, V still contains temporal information despite a naive temporal pooling method. After obtaining V, embodiments add another domain classifier (noted as global domain classifier $G_{gd}$) to explicitly align the embedded feature spaces of video-level features.

Therefore, the global domain loss $\mathcal{L}_{gd}$ may be added into the overall loss, which may be expressed as follows:

$$\mathcal{L} = \sum_{N_S} \mathcal{L}_y - \overset{?}{\Sigma} (\beta_l \mathcal{L}_{ld} + \beta_g \mathcal{L}_{gd}) \quad (4)$$

$$\mathcal{L}_{gd} = L_{gd}(G_{gd}(G_{tf}(f)), d) \quad (5)$$

where $\mathcal{L}_{gd}$ is also a binary cross entropy loss function, and $\beta_g$ is the trade-off weight for global domain loss $\mathcal{L}_{gd}$. In one or more embodiments, $G_{tf}$ may be the temporal pooling module 440 in FIG. 4.

(ii) Domain Attention Embodiments

Although aligning video-level feature spaces across domains benefits action segmentation, not all the frame-level features are equally important to align. In order to effectively align overall temporal dynamics, it is preferable to focus more on aligning the frame-level features that have larger domain discrepancy. Therefore, in one or more embodiments, larger attention weights are assigned to those features that have larger domain discrepancies.

Figure 3:
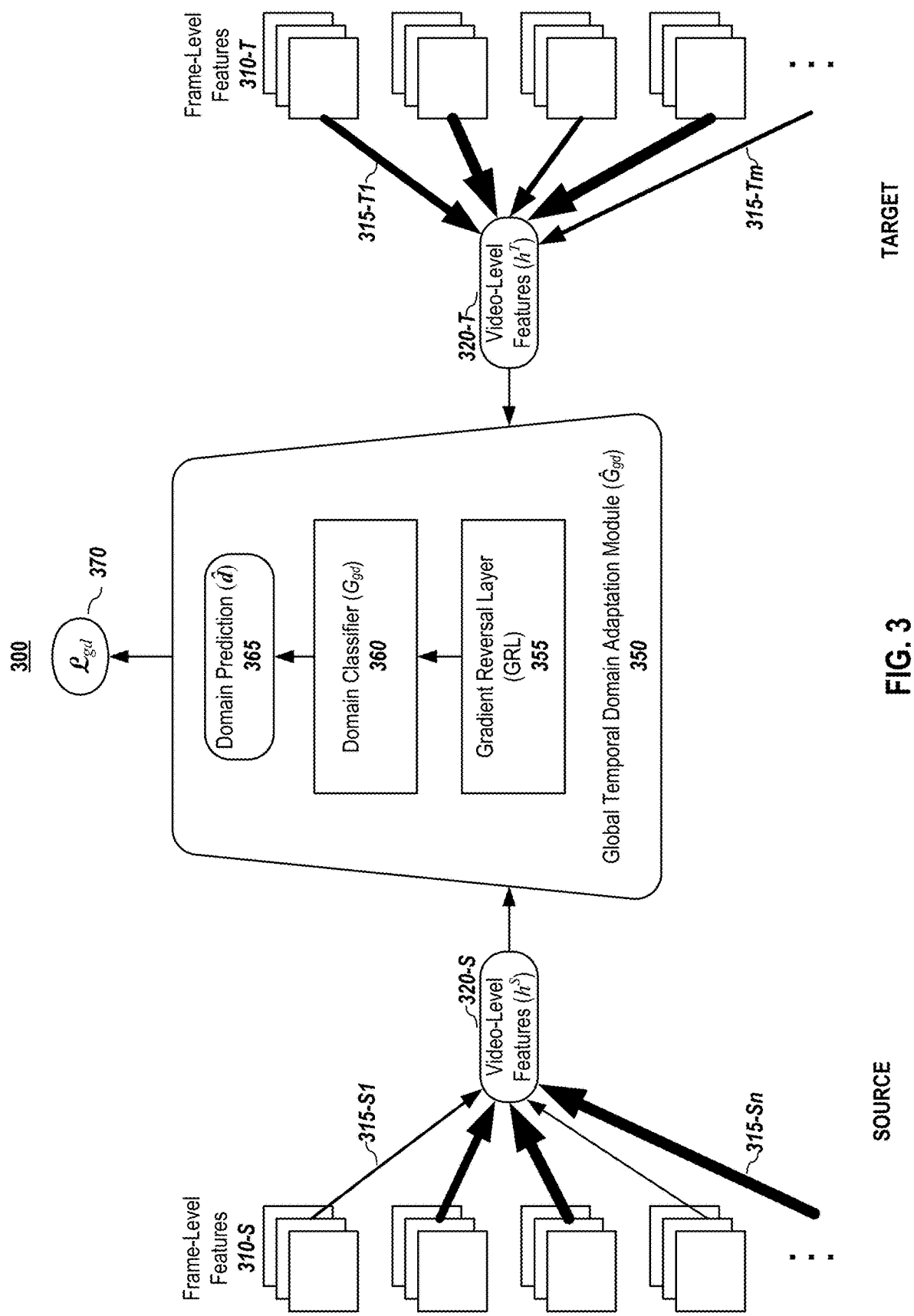
FIG. 3 graphically depicts an overview of global temporal domain adaptor with a domain attention mechanism, according to embodiments of the present disclosure.

FIG. 3 graphically depicts an overview of global temporal domain adaptor 350 with a domain attention mechanism, according to embodiments of the present disclosure. In one or more embodiments, the global temporal domain adaption module 350 has the same or similar structure as a local temporal domain adaption module, such as the one 250 depicted in FIG. 2.

In one or more embodiments, the global temporal domain adaptation module comprises a domain classifier $G_{gd}$ 360 that operates on video-level features 320 to make a domain prediction 365 of whether the video-level features are from a video from the source or target domain. In one or more embodiments, a gradient reversal layer (GRL) 355 is added the domain classifier $G_{gd}$ 360 when backpropagating. In embodiments, the loss, $\mathcal{L}_{gd}$ 370, represents the global domain loss.

As illustrated in FIG. 3, frame-level features (e.g., features 310-S from source videos and 310-T from target videos) are aggregate with different attention weights 315, which are graphically represented as arrows of different thicknesses, to form the video-level features h (e.g., $h^S$ 320-S for video-level features from source videos and $h^T$ 320-T for video-level features from target videos) for global temporal DA. Thicker arrows depicts larger attention weights. By way of illustration, based upon the domain attention mechanism, the weight 315-S1 for the first set of frame-level features from source video dataset is weighted less than the nth set of frame-level features; similarly, the weight 315-T1 for the first set of frame-level features from the target video dataset is weighted more than the mth set of frame-level features.

Figure 4:
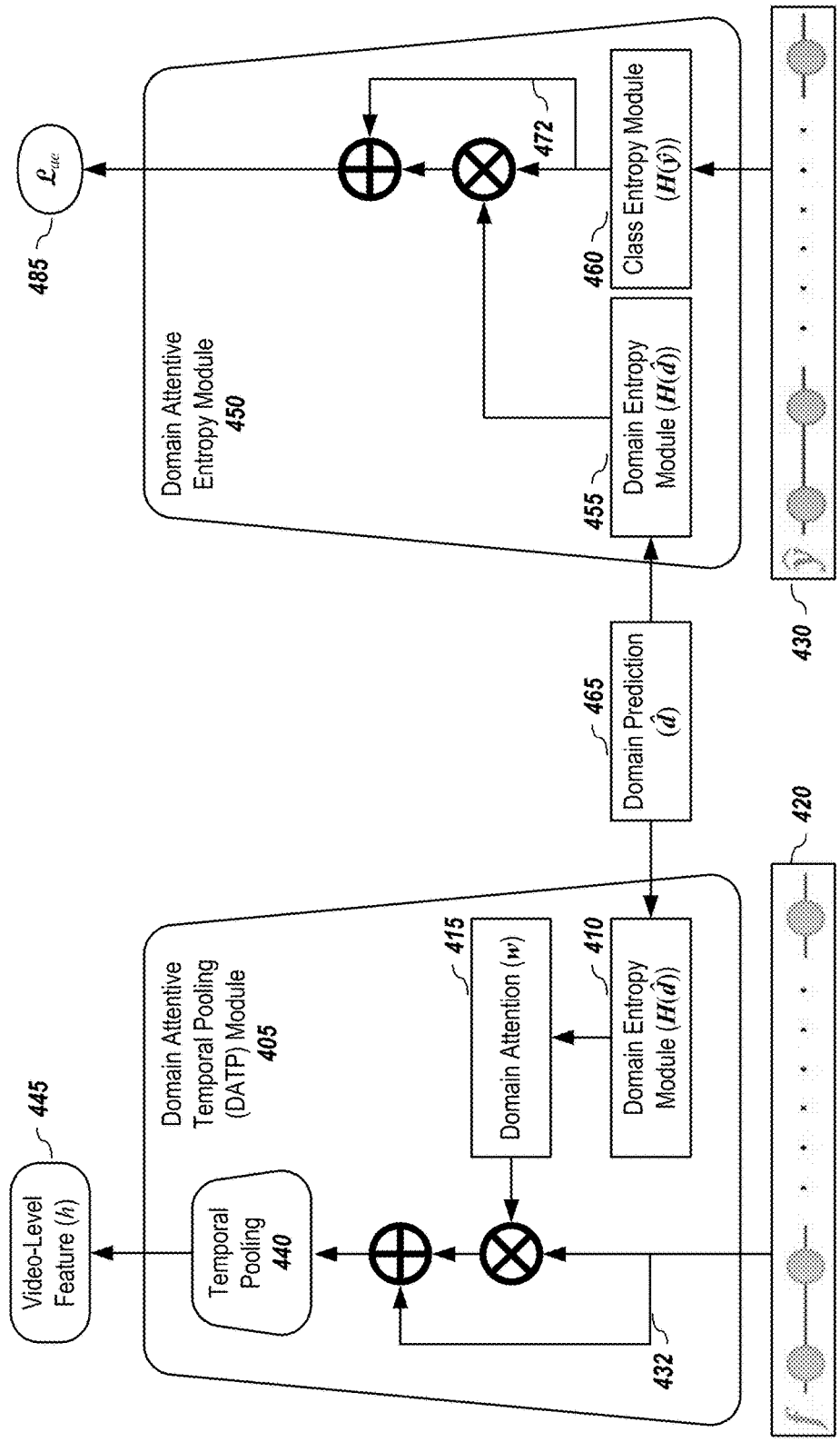
FIG. 4 depicts a domain attention mechanism that comprises two modules: domain attentive temporal pooling and domain attentive entropy, according to embodiments of the present disclosure.

In one or more embodiments, one or more stages are integrated with the domain attention mechanism, which may include both domain attention mechanism and temporal pooling, an embodiment of which is depicted in FIG. 4. In one or more embodiments, the domain attention temporal pooling module 405 utilizes the entropy criterion to generate the domain attention value 415 for each frame-level feature 420 as below:

$$w_j = 1 - H(\hat{d}_j) \quad (6)$$

where $\hat{d}_j$ 465 the domain prediction from $G_{ld}$ (e.g., domain classifier 260 in local temporal domain adaptor 250). $H(p) = -\Sigma p_k \cdot \log(p_k)$ may be used as an entropy function of a domain entropy module 410 or 455 to measure uncertainty; $w_j$ increases when $H(\hat{d}_j)$ decreases, which means the domains can be distinguished well. In one or more embodiments, a residual connection (e.g., skip connection 432) may also be added for more stable optimization. Finally, the attended frame-level features are aggregated with temporal pooling 440 to generate the video-level feature h 445. This process may be referred to as domain attentive temporal pooling (DATP) and may be expressed as:

$$h = \frac{1}{T} \sum_{j=1}^{T} (w_j + 1) \cdot f_j \quad (7)$$

FIG. 4 depicts a domain attention mechanism that comprises two modules: domain attentive temporal pooling 405 and domain attentive entropy 450, according to embodiments of the present disclosure. Both modules use the domain prediction $\hat{d}$ 465, which may be obtained from a local temporal domain adaption module (e.g., domain prediction 265 from local temporal domain adaption module 250 in FIG. 2), to make their inputs domain attentive with a residual connection (e.g., skip connection 432 and skip connection 472). In one or more embodiments, the domain attentive entropy module outputs an attentive entropy loss, $\mathcal{L}_{ae}$ 485.

In one or more embodiments, a minimum entropy regularization is added to refine the classifier adaptation. However, in one or more embodiments, it is desired to minimize the entropy for the videos that are similar across domains. Therefore, the domain attentive entropy module 450 attends to the videos which have low domain discrepancy, so that it can focus more on minimizing the entropy for these videos. In one or more embodiments, the attentive entropy loss $\mathcal{L}_{ae}$ may be expressed as follows:

$$\mathcal{L}_{ae} = \frac{1}{T} \sum_{j=1}^{T} (1 + H(\hat{d}_j)) \cdot H(\hat{y}_j) \quad (8)$$

where $\hat{d}$ and $\hat{y}$ is the output of $G_{ld}$ (e.g., domain classifier 260 in local temporal domain adaptor 250) and $G_y$ (e.g., fully connected network 225 in FIG. 2), respectively. In one or more embodiments, a residual connection 472 is adopted for stability.

b) Overall MTDA Embodiments (i) Overall MTDA Architecture Embodiments

FIG. 5 depicts an overall architecture of a mixed temporal domain adaptive system or video segmentation system 500, according to embodiments of the present disclosure.

Depicted in FIG. 5, by equipping temporal convolution network, such as one 205 depicted in FIG. 2, with a local adversarial domain classifier module $\hat{G}_{ld}$ (which may be implemented as a local temporal domain adaption module such as the embodiment 250 depicted in FIG. 2), a global adversarial domain classifier $\hat{G}_{gd}$ (which may be implemented as a global temporal domain adaption module such as the embodiment 350 depicted in FIG. 3), and a domain attention mechanism (which may be implemented as a domain attentive temporal pooling module such as the embodiment 405 and a domain attentive entropy module such as the embodiment 450 depicted in FIG. 4), a TCN may be converted into a domain adaptive TCN (DA-TCN) 520. $\mathcal{L}_{ld}$ 270 and $\mathcal{L}_{gd}$ 370 are the local and global domain loss, respectively. $\mathcal{L}_y$ 235 is the prediction loss, and $\mathcal{L}_{ae}$ 485 is the attentive entropy loss. By adding Equation (8) into Equation (4), and replacing $G_{ld}(f)$ with h by Equation (7), the overall loss of a final video segmentation system/Mixed Temporal Domain Adaptation (MTDA) system 500 may be expressed as follows:

$$\mathcal{L} = \sum^{N_S} \mathcal{L}_y - \frac{K}{S}(\beta_l \mathcal{L}_{ld} + \beta_g \mathcal{L}_{gd} - \mu \mathcal{L}_{ae}) \quad (9)$$

where $\mu$ is the weight for the attentive entropy loss. In one or more embodiments, $\beta_l$, $\beta_g$, and $\mu$ may be floating numbers from 0 to 1.

In one or more embodiments, multiple stages comprising one or more TCNs and one or more DA-TCNs are stacked to build a video segmentation network. That is, in one or more embodiments, a video segmentation network comprises a plurality of stages of either TCN or DA-TCN, which may be stack in which the input from one stage is the output from the prior stage. As depicted in FIG. 5, the input for the first stage 520-1 is the input frame-level features from the feature extractor 510. In one or more embodiments, the TCN/DA-TCN of a second or subsequent stage may comprise an initial processing step (e.g. a convolution of kernel size 1) that converts the input from a prior stage into what may be deemed as a set of frame-level features.

In one or more embodiments, a final video segmentation system may be formed by combining the multi-stage video segmentation network with one or more feature extractors or feature generators 510 that that receive the input videos and, for each input video, convert the input videos into a set of frame-level features 515.

c) MTDA Training Embodiments

FIG. 6 depicts a methodology for training a mixed temporal domain adaptive network/video segmentation network, according to embodiments of the present disclosure. In one or more embodiments, a method for training a video segmentation system for assigning a set of action labels to frames of a video includes the following steps.

As a preliminary matter, each input video from either a first set of video data (e.g., source dataset, in which the videos have associated action labels) or a second set of video data (e.g., target dataset, in which the videos do not have associated action labels) are converted into a frame-level feature vector or set of frame-level features. In one or more embodiments, a pre-trained I3D feature extractor may be used for extracting the frame-level features from the videos; although it shall be noted that other feature extractors/feature generators may be used. In one or more embodiments, one or more feature extractors may be included with the video segmentation network to form a video segmentation system.

Given a set of frame-level features of frames of an input video, it is input (605) into a video segmentation network, such as one depicted in FIG. 5. In one or more embodiment, the video segmentation network comprises at least one domain adaption temporal convolution network, which may include: a multi-layer temporal convolution network that receives an input related to the set of frame-level features of the input video and outputs a set of spatio-temporal-refined frame-level features; a classification layer that receives the set of spatio-temporal-refined frame-level features and outputs a set of frame-level predictions; a local temporal domain adaptation model that receives the set of spatio-temporal-refined frame-level features and outputs a domain prediction whether the set of spatio-temporal-refined frame-level features are from an input video from the first set of video data or the second set of video data; a domain attentive pooling component that receives the set of spatio-temporal-refined frame-level features and the domain prediction and uses domain attention weights to combine the set of spatio-temporal-refined frame-level features into a video-level feature; a global temporal domain adaptation model that receives the video-level feature and outputs a video-level domain prediction whether the video-level feature is from an input video from the first set of video data or the second set of video data; and a domain attentive entropy component that receives the set of frame-level predictions and the domain prediction and outputs an attentive entropy loss.

In one or more embodiments, the video segmentation network may include at least one temporal convolution network, which may be combined, in stages, with one or more domain adaption temporal convolution network stages. In an embodiments, the video segmentation network includes a first temporal convolution network stage, two domain adaption temporal convolution network stages, and then a final temporal convolution network stage that outputs the final set of frame-level predictions; in this multi-stage configuration, an output from one stage may be used as an input to the next stage.

Returning to FIG. 6, the video segmentation network outputs (610), for each input video from the first set of video data and the second set of video data, a final set of frame-level predictions, in which each frame of at least some of the frames from a set of frames of the input video has an associated label prediction.

To train the stages of the video segmentation network, various losses may be computed (615). In one or more embodiments, the computed losses may include: a prediction loss related to the final set of frame-level predictions relative to the associated action labels for the input video, if the input video is from the source dataset domain; a local domain loss, which represents error in predicting whether the set of spatio-temporal-refined frame-level features are from an input video from the first set of video data or the second set of video data; a global domain loss, which represents error in predicting whether a video-level feature is from an input video from the first set of video data or the second set of video data; and the attentive entropy loss. In embodiments, one or more of the computed losses may be used to update (620) the video segmentation network. In one or more embodiments, the local temporal domain adaptation module of a TCN or DA-TCN stage may include a gradient reversal layer that reverses a gradient sign of the local domain loss when updating the network. Similarly, the global temporal domain adaptation module of a TCN or DA-TCN stage may include a gradient reversal layer that reverses a gradient sign of the global domain loss when updating the network.

Once the training has completed, a final trained video segmentation network is output. Training may be completed when a stop condition has been reached. In one or more embodiments herein that include a stop condition, a stop condition may include one or more of the following: (1) a set number of iterations have been performed; (2) an amount of processing time has been reached; (3) convergence (e.g., the difference between consecutive iterations is less than a first threshold value); (4) divergence; and (5) an acceptable result has been reached.

d) MTDA Inference Embodiments

Figure 7:
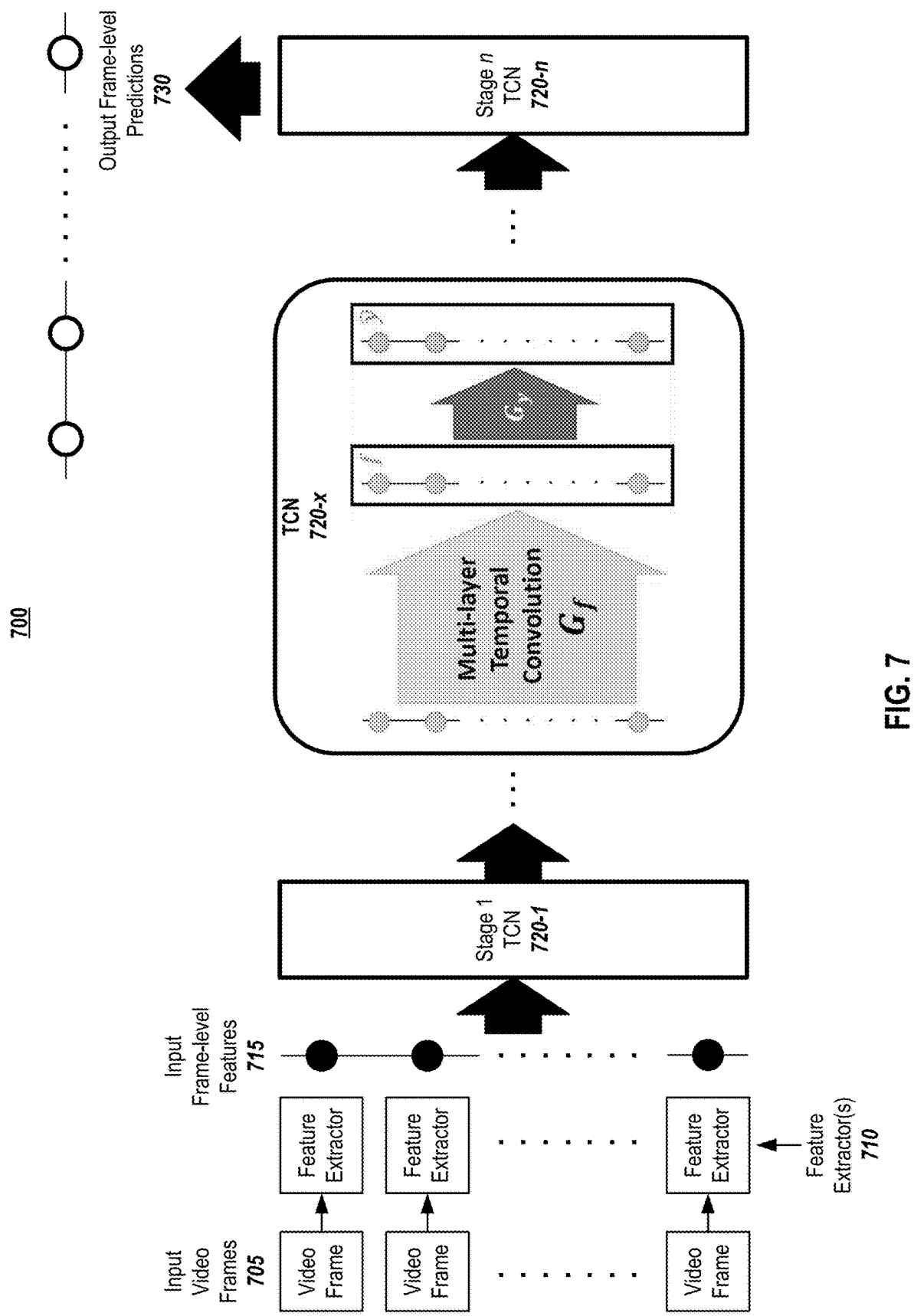
FIG. 7 depicts a trained MTDA/video segmentation system, according to embodiments of the present disclosure.

FIG. 7 depicts a trained MTDA/video segmentation system, according to embodiments of the present disclosure. FIG. 8 depicts a methodology 800 for using a deployed trained MTDA/video segmentation system for video action inference, according to embodiments of the present disclosure.

In one or more embodiments, the trained system 700 receives (805) as input a video that is to be segmented by actions. In one or more embodiments, the trained system 700 includes a feature generator/feature extractor 710 that receives the video frames 705 of the input video and converts the video into a set of frame-level features 715. In one or more embodiments, a trained I3D feature extractor may be used for extracting the frame-level features from the video; although it shall be noted that other feature extractors/feature generators may be used. In one or more embodiments, the trained system 700 also includes at least one trained domain adaption temporal convolution network (e.g., 720-*x*), which comprises: a multi-layer temporal convolution network that receives an input related to the set of frame-level features of the input video and outputs a set of spatio-temporal-refined frame-level features, and a classification layer that receives the set of spatio-temporal-refined frame-level features and outputs a set of frame-level predictions. At least one of the trained temporal convolution network (e.g., 720-*x*) was trained using with a local adversarial domain classifier and a global adversarial domain classifier, and may also have been trained with a domain attention mechanism. For example, at least one of the trained temporal convolution networks was trained using an embodiment disclosed in the prior section. It shall be noted that the system 700 may include multiple stages (e.g., stages 720), which may originally be TCN stages or DA-TCN stages (which may be modified after training to resemble the embodiment disclosed in FIG. 7, item 720-*x*), or a combination thereof. Ultimately, the system 700 outputs (810) the final frame-level predictions 730 for the input video.

D. Experimental Results

To evaluate how embodiments discussed herein diminish spatiotemporal discrepancy for action segmentation, three datasets Dataset A, Dataset B, and Dataset C were used. It shall be noted that these experiments and results are provided by way of illustration and were performed under specific conditions using a specific embodiment or embodiments; accordingly, neither these experiments nor their results shall be used to limit the scope of the disclosure of the current patent document.

1. Datasets

Dataset A contains 28 videos including 7 activities performed by 4 subjects. There are totally 11 action classes including background. On average, each video has 20 action instances and is around one minute long. A 4-fold cross-validation was used for evaluation by leaving one subject out. Dataset B contains 50 videos for related activities performed by 25 subjects. There are totally 17 action classes. On average, each video contains 20 action instances and is about 6 minutes long. For evaluation, a 5-fold cross-validation was used by leaving five subjects out. Dataset C has approximately 1700 videos for activities performed by approximately 50 subjects. The videos were recorded in 18 different but related environments with 48 action classes where each video contains 6 action instances on average and is around 3 minutes long. For evaluation, a standard 4-fold cross-validation was used by leaving 13 subjects out. These three datasets fit the evaluation goal since the training and testing sets are separated by different subjects, which means that there should be adaptation of the same actions across different people by decreasing the spatio-temporal variations across videos.

2. Evaluation Metrics

For all the three datasets, the following evaluation metrics as in citation [3] (see Section D.3.d, infra): frame-wise accuracy (Acc), segmental edit score, and segmental F1 score at the IoU threshold k %, denoted as F1@k (k=f10; 25; 50 g). While frame-wise accuracy is one of the most common evaluation metrics for action segmentation, it does not take into account the temporal dependencies of the prediction, causing large qualitative differences with similar frame-wise accuracy. In addition, long action classes have higher impact on this metric than shorter action classes, making this metric not able to reflect over-segmentation errors.

To address the above limitations, the segmental edit score penalizes over-segmentation by measuring the ordering of predicted action segments independent of slight temporal shifts. Finally, another suitable metric segmental F1 score (F1@k) becomes popular recently since it is found that the score numbers better indicate the qualitative segmentation results. F1@k also penalizes over-segmentation errors while ignoring minor temporal shifts between the predictions and ground truth. F1@k is determined by the total number of actions but not depends on the duration of each action instance, which is similar to mean average precision (mAP) with intersection-over-union (IoU) overlap criteria.

3. Experimental Results

Test embodiments were first compared with a baseline model MS-TCN (citation [7]) to see how these test embodiments effectively utilize the unlabeled videos for action segmentation. "Source only" means the model is trained only with source labeled videos. And then an embodiment approach was compared to state-of-the-art methods on all three datasets.

a) Local Temporal Domain Adaptation

By integrating domain classifiers with frame-level features f, the results on all three datasets with respect to all the metrics are improved significantly, as shown in the row "DA (L)" in Table 1. For example, on Dataset A, a tested embodiment outperforms the baseline by 4.6% for F1@50, 5.5% for the edit score and 3.8% for the frame-wise accuracy. Although "DA (L)" mainly works on the frame-level features, they are learned using the context from neighbor frames, so they still contain temporal information, which is important to diminish the temporal variations for actions across domains.

b) Mixed Temporal Domain Adaptation

Despite the improvement from local temporal DA, the temporal receptive fields of frame-level features still may not be guaranteed to cover the whole video length. Therefore, frame-level features are, in embodiments, aggregated to generate a video-level feature for each video and additional domain classifier are applied on it. However, aggregating frames by temporal pooling without considering the importance of each frame may not ensure better performance, especially for Dataset C, which contains much higher domain discrepancy than the other two. The F1 score and frame-wise accuracy both have slightly worse results, as shown in the row "DA (L+G)" in Table 1. Therefore, the domain attention mechanism was applied to aggregate frames more effectively, leading to better global temporal DA performance. For example, on Dataset C, "DA (L+G+A)" outperforms "DA (L)" by 1.4% for F1@50, 1.9% for the edit score and 0.7% for the frame-wise accuracy, as shown in Table 1. The embodiment, "DA (L+G+A)", which is also MTDA, outperforms the baseline by large margins (e.g., 6.4% for F1@50, 6.8% for the edit score and 3.7% for the frame-wise accuracy on Dataset A; 8.0% for F1@50, 7.3% for the edit score and 2.5% for the frame-wise accuracy on Dataset B), as demonstrated in Table 1.

TABLE 1

The experimental results for different test embodiments on Dataset A, Dataset B, and the Dataset C (L: local temporal DA, G: global temporal DA without domain attention, A: domain attention mechanism).

| Dataset A | F1 @ {10, 25, 50} | | | Edit | Acc |
|---|---|---|---|---|---|
| Source only (MS-TCN) | 85.8 | 83.4 | 69.8 | 79.0 | 76.3 |
| DA (L) | 89.6 | 87.9 | 74.4 | 84.5 | 80.1 |
| DA (L + G) | 90.0 | 88.6 | 74.9 | 85.6 | 79.6 |
| DA (L + G + A) | 90.5 | 88.4 | 76.2 | 85.8 | 80.0 |
| Dataset B | F1 @ {10, 25, 50} | | | Edit | Acc |
| Source only (MS-TCN) | 76.3 | 74.0 | 64.5 | 67.9 | 80.7 |
| DA (L) | 79.2 | 77.8 | 70.3 | 72.0 | 82.8 |
| DA (L + G) | 80.2 | 78.4 | 70.6 | 73.4 | 82.2 |
| DA (L + G + A) | 82.0 | 80.1 | 72.5 | 75.2 | 83.2 |
| Dataset C | F1 @ {10, 25, 50} | | | Edit | Acc |
| Source only (MS-TCN) | 52.6 | 48.1 | 37.9 | 61.7 | 66.3 |
| DA (L) | 72.8 | 67.8 | 55.1 | 71.7 | 70.3 |
| DA (L + G) | 72.6 | 66.9 | 54.3 | 72.6 | 69.2 |
| DA (L + G + A) | 74.2 | 68.6 | 56.5 | 73.6 | 71.0 | c) Comparisons

Here embodiments of the MTDA approach were compared to the state-of-the-art methods, and an MTDA embodiment outperforms all the previous methods on the three datasets with respect to three evaluation metrics: F1 score, edit distance, and frame-wise accuracy, as shown in Table 2.

For the Dataset A, the authors of MS-TCN (citation [7]) also fine-tune the I3D features to improve the performance (e.g. from 85.8% to 87.5% for F1@10). The tested MTDA embodiment outperformed the fine-tuned MS-TCN even without any fine-tuning process since the temporal features were learned more effectively from unlabeled videos, which is more important for action segmentation.

For Dataset C, the authors of MS-TCN (citation [7]) also use the improved dense trajectories (IDT) features, which encode only motion information and outperform the I3D features since the encoded spatial information is not the critical factor for Dataset C. The tested MTDA embodiment outperformed the IDT-version of MS-TCN by a large margin with the same I3D features. This shows that a DATP module embodiment effectively aggregate frames by considering the temporal structure for action segmentation.

TABLE 2

Comparison with the state-of-the-art on Dataset A, Dataset B, and Dataset C. ycGAN (citation [6]) utilizes additional modalities instead of RGB only.

| Dataset A | F1 @ {10, 25, 50} | | | Edit | Acc |
|---|---|---|---|---|---|
| ST-CNN [1] | 58.7 | 54.4 | 41.9 | 49.1 | 60.6 |
| Bi-LSTM [2] | 66.5 | 59.0 | 43.6 | — | 55.5 |
| ED-TCN [3] | 72.2 | 69.3 | 56.0 | — | 64.0 |
| TricorNet [4] | 76.0 | 71.1 | 59.2 | — | 64.8 |
| TDRN [5] | 79.2 | 74.4 | 62.7 | 74.1 | 70.1 |
| cGAN [6] | 80.1 | 77.9 | 69.1 | 78.1 | 78.5 |
| MS-TCN [7] | 85.8 | 83.4 | 69.8 | 79.0 | 76.3 |
| MS-TCN (FT) [7] | 87.5 | 85.4 | 74.6 | 81.4 | 79.2 |
| MTDA | 90.5 | 88.4 | 76.2 | 85.8 | 80.0 |
| Dataset B | F1 @ {10, 25, 50} | | | Edit | Acc |
| IDT + LM [8] | 44.4 | 38.9 | 27.8 | 45.8 | 48.7 |
| Bi-LSTM [2] | 62.6 | 58.3 | 47.0 | 55.6 | 55.7 |
| ST-CNN [1] | 55.9 | 49.6 | 37.1 | 45.9 | 59.4 |
| ED-TCN [3] | 68.0 | 63.9 | 52.6 | 59.8 | 64.7 |
| TricorNet [4] | 70.1 | 67.2 | 56.6 | 62.8 | 67.5 |
| TDRN [5] | 72.9 | 68.5 | 57.2 | 66.0 | 68.1 |
| MS-TCN [7] | 76.3 | 74.0 | 64.5 | 67.9 | 80.7 |
| cGAN [6] | 80.1 | 78.7 | 71.1 | 76.9 | 74.5 |
| MTDA | 82.0 | 80.1 | 72.5 | 75.2 | 83.2 |
| Dataset C | F1 @ {10, 25, 50} | | | Edit | Acc |
| ED-TCN [3] | — | — | — | — | 43.3 |
| HTK [9] | — | — | — | — | 50.7 |
| TCFPN [10] | — | — | — | — | 52.0 |
| HTK (64) [11] | — | — | — | — | 56.3 |
| GRU [12] | — | — | — | — | 60.6 |
| MS-TCN [7] | 52.6 | 48.1 | 37.9 | 61.7 | 66.3 |

TABLE 2-continued

Comparison with the state-of-the-art on Dataset A, Dataset B, and Dataset C.
ycGAN (citation [6]) utilizes additional modalities instead of RGB only.

| | | | | | |
|---|---|---|---|---|---|
| MS-TCN (IDT) [7] | 58.2 | 52.9 | 40.8 | 61.4 | 65.1 |
| MTDA | 74.2 | 68.6 | 56.5 | 73.6 | 71.0 | d) Citations:

[1] C. Lea, A. Reiter, R. Vidal, and G. D. Hager. Segmental spatiotemporal CNNS for fine-grained action segmentation. In *European Conference on Computer Vision (ECCV)*, 2016.

[2] B. Singh, T. K. Marks, M. Jones, O. Tuzel, and M. Shao. A multi-stream bi-directional recurrent neural network for fine-grained action detection. In *IEEE Conference on Computer Vision and Pattern Recognition (CVPR)*, 2016.

[3] C. Lea, M. D. Flynn, R. Vidal, A. Reiter, and G. D. Hager. Temporal convolutional networks for action segmentation and detection. In *IEEE Conference on Computer Vision and Pattern Recognition (CVPR)*, 2017.

[4] L. Ding and C. Xu. Tricornet: A hybrid temporal convolutional and recurrent network for video action segmentation. arXiv preprint arXiv:1705.07818, 2017.

[5] P. Lei and S. Todorovic. Temporal deformable residual networks for action segmentation in videos. In *IEEE Conference on Computer Vision and Pattern Recognition (CVPR)*, 2018.

[6] H. Gammulle, T. Fernando, S. Denman, S. Sridharan, and C. Fookes. Coupled generative adversarial network for continuous fine-grained action segmentation. In *IEEE Winter Conference on Applications of Computer Vision (WACV)*, 2019.

[7] Y. A. Farha and J. Gall. MS-TCN: Multi-stage temporal convolutional network for action segmentation. In *IEEE Conference on Computer Vision and Pattern Recognition (CVPR)*, 2019.

[8] A. Richard and J. Gall. Temporal action detection using a statistical language model. In *IEEE Conference on Computer Vision and Pattern Recognition (CVPR)*, 2016.

[9] H. Kuehne, A. Richard, and J. Gall. Weakly supervised learning of actions from transcripts. *Computer Vision and Image Understanding (CVIU)*, 163:78-89, 2017.

[10] L. Ding and C. Xu. Weakly-supervised action segmentation with iterative soft boundary assignment. In *IEEE Conference on Computer Vision and Pattern Recognition (CVPR)*, 2018.

[11] H. Kuehne, J. Gall, and T. Serre. An end-to-end generative framework for video segmentation and recognition. In *IEEE Winter Conference on Applications of Computer Vision (WACV)*, 2016.

[12] A. Richard, H. Kuehne, and J. Gall. Weakly supervised action learning with RNN-based fine-to-coarse modeling. In *IEEE Conference on Computer Vision and Pattern Recognition (CVPR)*, 2017.

e) Qualitative Results

In addition to evaluating the quantitative performance using the above metrics, it is also common to evaluate the qualitative performance to ensure that the prediction results are aligned with human vision. Here embodiments were compared with the MS-TCN model (citation [7]) and the ground truth, as shown in FIG. 9.

Figure 9:
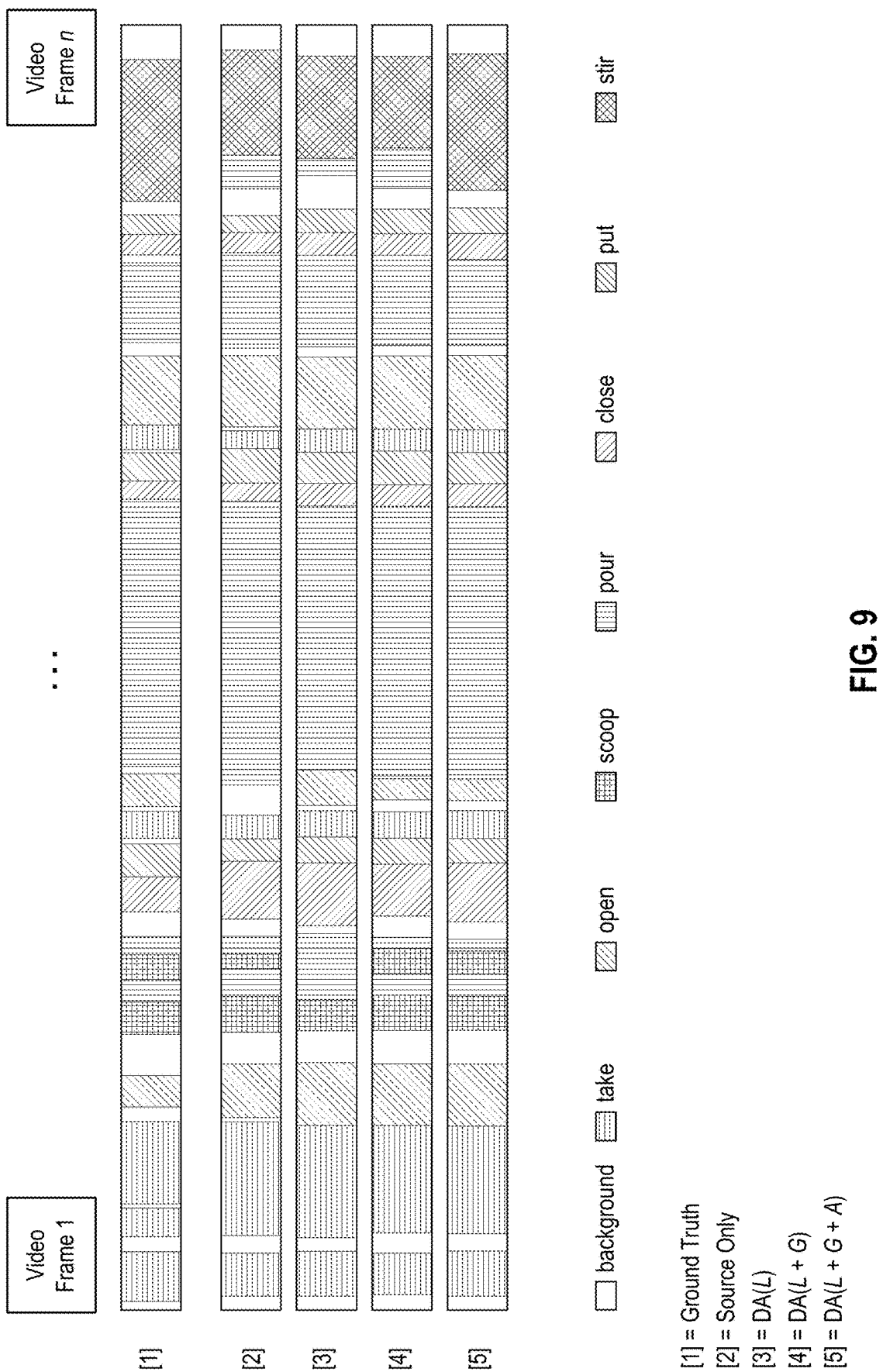
FIG. 9 illustrate qualitative results of temporal action segmentation on an input video for an activity, according to embodiments of the present disclosure.

FIG. 9 illustrate qualitative results of temporal action segmentation on an input video for an activity, according to embodiments of the present disclosure. The video frames in the first row represent temporal order (from left to right). "Source only" refers to the MS-TCN model (citation [7]). MS-TCN fails to predict open before the long pour action in the middle part of the video, and falsely predict pour before stir in the end of the video, as shown in the "Source only" row. With local and global temporal DA, the tested embodiment can detect all the actions happened in the video, as shown in the row "DA (L+G)". Finally, with the domain attention mechanism, tested MTDA embodiment also removes the falsely predicted action pour.

E. Computing System Embodiments

In one or more embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 10:
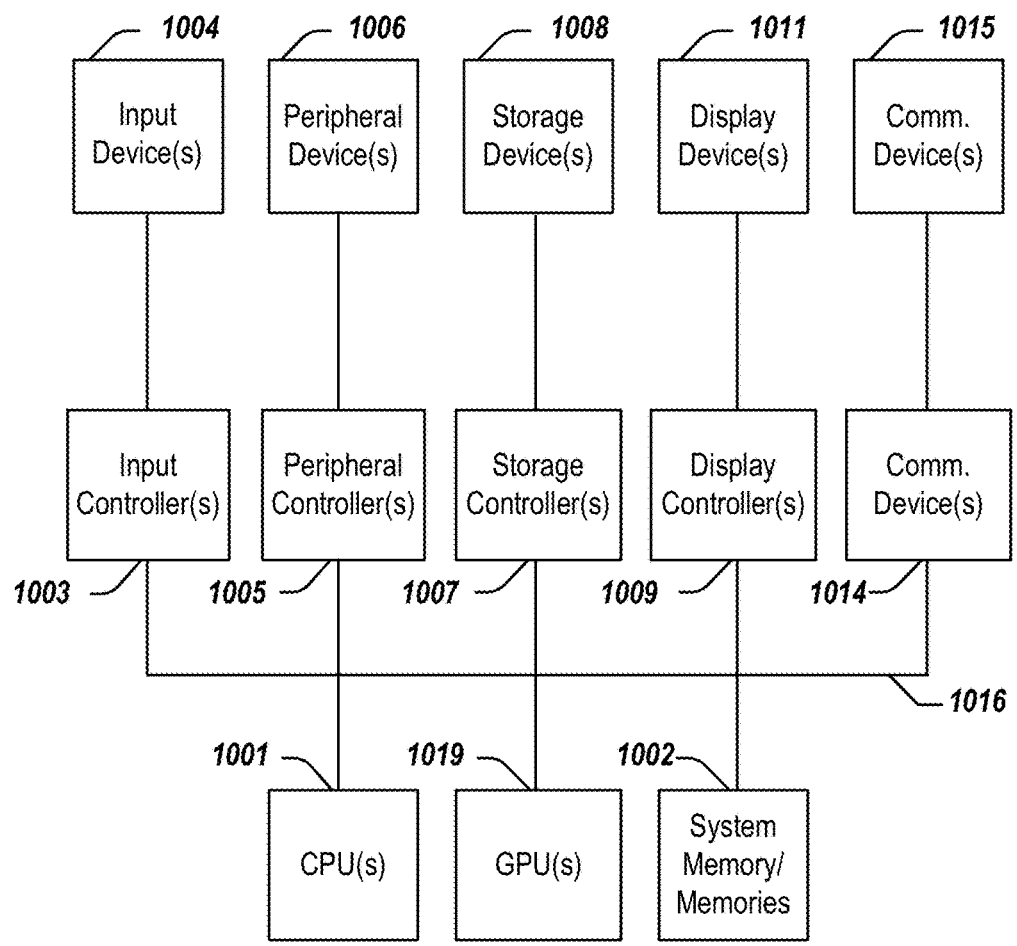
FIG. 10 depicts a simplified block diagram of a computing device/information handling system, according to embodiments of the present disclosure.

FIG. 10 depicts a simplified block diagram of a computing device/information handling system (or computing system) according to embodiments of the present disclosure. It will be understood that the functionalities shown for system 1000 may operate to support various embodiments of a computing system—although it shall be understood that a computing system may be differently configured and include different components, including having fewer or more components as depicted in FIG. 10.

As illustrated in FIG. 10, the computing system 1000 includes one or more central processing units (CPU) 1001 that provides computing resources and controls the computer. CPU 1001 may be implemented with a microprocessor or the like, and may also include one or more graphics processing units (GPU) 1019 and/or a floating-point coprocessor for mathematical computations. System 1000 may also include a system memory 1002, which may be in the form of random-access memory (RAM), read-only memory (ROM), or both.

A number of controllers and peripheral devices may also be provided, as shown in FIG. 10. An input controller 1003 represents an interface to various input device(s) 1004, such as a keyboard, mouse, touchscreen, and/or stylus. The computing system 1000 may also include a storage controller 1007 for interfacing with one or more storage devices 1008 each of which includes a storage medium such as magnetic tape or disk, or an optical medium that might be used to record programs of instructions for operating systems, utilities, and applications, which may include embodiments of programs that implement various aspects of the present disclosure. Storage device(s) 1008 may also be used to store processed data or data to be processed in accordance with the disclosure. The system 1000 may also include a display controller 1009 for providing an interface to a display device 1011, which may be a cathode ray tube (CRT), a thin film transistor (TFT) display, organic light-emitting diode, electroluminescent panel, plasma panel, or other type of display. The computing system 1000 may also include one or more peripheral controllers or interfaces 1005 for one or more peripherals 1006. Examples of peripherals may include one or more printers, scanners, input devices, output devices, sensors, and the like. A communications controller 1014 may interface with one or more communication devices 1015, which enables the system 1000 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media may include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for training a video segmentation system for assigning a set of action labels to frames of a video, the method comprising:

inputting, for each input video from a first set of video data and from a second set of video data, a set of frame-level features of frames of the input video into a video segmentation network, the first set of video data comprising videos with associated action labels, the second set of video data comprising videos without associated action labels, and the video segmentation network comprising:

at least one domain adaption temporal convolution network, which comprises:

a multi-layer temporal convolution network that receives an input related to the set of frame-level features of the input video and outputs a set of spatio-temporal-refined frame-level features;

a classification layer that receives the set of spatio-temporal-refined frame-level features and outputs a set of frame-level predictions;

a local temporal domain adaptation model that receives the set of spatio-temporal-refined frame-level features and outputs a domain prediction whether the set of spatio-temporal-refined frame-level features are from an input video from the first set of video data or the second set of video data;

a domain attentive pooling component that receives the set of spatio-temporal-refined frame-level features and the domain prediction and uses domain attention weights to combine the set of spatio-temporal-refined frame-level features into a video-level feature; and a global temporal domain adaptation model that receives the video-level feature and outputs a video-level domain prediction whether the video-level feature is from an input video from the first set of video data or the second set of video data;

outputting, for each input video from the first set of video data and from the second set of video data, a final set of frame-level predictions in which each frame of at least some of the frames from a set of frames of the input video has an associated label prediction;

computing losses for the video segmentation network, the computed losses comprising at least one of the following:

responsive to an input video being from the first set of video data, a prediction loss related to the final set of frame-level predictions relative to the associated action labels for the input video;

a local domain loss, which represents error in predicting whether the set of spatio-temporal-refined frame-level features are from an input video from the first set of video data or the second set of video data; and a global domain loss, which represents error in predicting whether the video-level feature is from an input video from the first set of video data or the second set of video data; and updating the video segmentation network using the computed losses.

2. The computer-implemented method of claim 1 wherein:

the local temporal domain adaptation module further comprises a gradient reversal layer that reverses a gradient sign of the local domain loss when updating the multi-layer temporal convolution network; and the global temporal domain adaptation module further comprises a gradient reversal layer that reverse a gradient sign of the global domain loss when updating the multi-layer temporal convolution network.

3. The computer-implemented method of claim 1 wherein the video segmentation system further comprises:

a feature generator that receives the input videos and, for each input video, converts the input video into the set of frame-level features.

4. The computer-implemented method of claim 1 wherein the video segmentation network further comprises at least one temporal convolution network stage, which comprises:

a multi-layer temporal convolution network that receives an input related to the set of frame-level features of the input video and outputs a set of spatio-temporal-refined frame-level features; and a classification layer that receives the set of spatio-temporal-refined frame-level features and outputs a set of frame-level predictions.

5. The computer-implemented method of claim 4 wherein the video segmentation network comprises:

at least one temporal convolution network stage; and a plurality of domain adaption temporal convolution network stages.

6. The computer-implemented method of claim 5 wherein the video segmentation network comprises:

a first temporal convolution network stage;

a first domain adaption temporal convolution network stage;

a second domain adaption temporal convolution network stage; and a second temporal convolution network stage that outputs the final set of frame-level predictions, wherein an output of one stage is used as an input to the next stage.

7. The computer-implemented method of claim 6 wherein the input related to the set of frame-level features of the input video comprises:

the set of frame-level features of the input video if the multi-layer temporal convolution network is the first the multi-layer temporal convolution network of the video segmentation network; and the set of frame-level predictions from a prior stage if the multi-layer temporal convolution network is not the first the multi-layer temporal convolution network of the video segmentation network.

8. The computer-implemented method of claim 1 wherein, for at least one domain adaption temporal convolution network, the input related to the set of frame-level features of the input video comprises:

the set of frame-level predictions from a prior stage.

9. The computer-implemented method of claim 1 wherein at least one domain adaption temporal convolution network further comprises:

a domain attentive entropy component that receives the set of frame-level predictions and the domain prediction and outputs an attentive entropy loss; and wherein the step of updating the video segmentation network using the computed losses includes the attentive entropy loss.

10. A computer-implemented method for using a video segmentation system to assign labels to at least some of the frames of a video, the method comprising:

inputting the video into the video segmentation system comprising:

a feature generator that receives the video and converts the video into a set of frame-level features;

a video segmentation network comprising at least one domain adaption temporal convolution network, which comprises:

a multi-layer temporal convolution network that receives an input related to the set of frame-level features of the input video and outputs a set of spatio-temporal-refined frame-level features;

a classification layer that receives the set of spatio-temporal-refined frame-level features and outputs a set of frame-level predictions; and outputting, for the video, a final set of frame-level predictions in which each frame of at least some of the frames from the set of frames of the video has an associated label prediction, wherein the at least one domain adaption temporal convolution network was trained by performing steps comprising:

inputting, for each input video from a first set of video data and from a second set of video data, a set of frame-level features of frames of the input video into the video segmentation network, the first set of video data comprising videos with associated action labels, the second set of video data comprising videos without associated action labels, and the video segmentation network comprising:
- at least one domain adaption temporal convolution network, which comprises:
  - a multi-layer temporal convolution network that receives an input related to the set of frame-level features of the input video and outputs a set of spatio-temporal-refined frame-level features;
  - a classification layer that receives the set of spatio-temporal-refined frame-level features and outputs a set of frame-level predictions;
  - a local temporal domain adaptation model that receives the set of spatio-temporal-refined frame-level features and outputs a domain prediction whether the set of spatio-temporal-refined frame-level features are from an input video from the first set of video data or the second set of video data;
  - a domain attentive pooling component that receives the set of spatio-temporal-refined frame-level features and the domain prediction and uses domain attention weights to combine the set of spatio-temporal-refined frame-level features into a video-level feature; and
  - a global temporal domain adaptation model that receives the video-level feature and outputs a video-level domain prediction whether the video-level feature is from an input video from the first set of video data or the second set of video data;
- outputting, for each input video from the first set of video data and from the second set of video data, a final set of frame-level predictions in which each frame of at least some of the frames from a set of frames of the input video has an associated label prediction;
- computing losses for the video segmentation network, the computed losses comprising at least one of the following:
  - responsive to an input video being from the first set of video data, a prediction loss related to the final set of frame-level predictions relative to the associated action labels for the input video;
  - a local domain loss, which represents error in predicting whether the set of spatio-temporal-refined frame-level features are from an input video from the first set of video data or the second set of video data; and
  - a global domain loss, which represents error in predicting whether the video-level feature is from an input video from the first set of video data or the second set of video data; and
- updating the video segmentation network using the computed losses.

11. The computer-implemented method of claim 10 wherein:
- the local temporal domain adaptation module further comprises a gradient reversal layer that reverses a gradient sign of the local domain loss when updating the multi-layer temporal convolution network; and
- the global temporal domain adaptation module further comprises a gradient reversal layer that reverse a gradient sign of the global domain loss when updating the multi-layer temporal convolution network.

12. The computer-implemented method of claim 10 wherein the video segmentation network further comprises:
- at least one temporal convolution network stage, which comprises:
  - a multi-layer temporal convolution network that receives an input related to the set of frame-level features of the input video and outputs a set of spatio-temporal-refined frame-level features; and
  - a classification layer that receives the set of spatio-temporal-refined frame-level features and outputs a set of frame-level predictions; and
- wherein, for at least one domain adaption temporal convolution network, the input related to the set of frame-level features of the input video comprises the set of frame-level predictions from a prior temporal convolution network or a prior domain adaption temporal convolution network.

13. The computer-implemented method of claim 10 wherein at least one domain adaption temporal convolution network further comprises:
- a domain attentive entropy component that receives the set of frame-level predictions and the domain prediction and outputs an attentive entropy loss; and
- wherein the step of updating the video segmentation network using the computed losses includes the attentive entropy loss.

14. A non-transitory computer-readable medium or media comprising one or more sequences of instructions which, when executed by one or more processors, causes steps for training a video segmentation system for assigning a set of action labels to frames of a video, the method comprising:
- inputting, for each input video from a first set of video data and from a second set of video data, a set of frame-level features of frames of the input video into a video segmentation network, the first set of video data comprising videos with associated action labels, the second set of video data comprising videos without associated action labels, and the video segmentation network comprising:
  - at least one domain adaption temporal convolution network, which comprises:
    - a multi-layer temporal convolution network that receives an input related to the set of frame-level features of the input video and outputs a set of spatio-temporal-refined frame-level features;
    - a classification layer that receives the set of spatio-temporal-refined frame-level features and outputs a set of frame-level predictions;
    - a local temporal domain adaptation model that receives the set of spatio-temporal-refined frame-level features and outputs a domain prediction whether the set of spatio-temporal-refined frame-level features are from an input video from the first set of video data or the second set of video data;
    - a domain attentive pooling component that receives the set of spatio-temporal-refined frame-level features and the domain prediction and uses domain attention weights to combine the set of spatio-temporal-refined frame-level features into a video-level feature; and
    - a global temporal domain adaptation model that receives the video-level feature and outputs a video-level domain prediction whether the video-level feature is from an input video from the first set of video data or the second set of video data;

outputting, for each input video from the first set of video data and from the second set of video data, a final set of frame-level predictions in which each frame of at least some of the frames from a set of frames of the input video has an associated label prediction;

computing losses for the video segmentation network, the computed losses comprising at least one of the following:

responsive to an input video being from the first set of video data, a prediction loss related to the final set of frame-level predictions relative to the associated action labels for the input video;

a local domain loss, which represents error in predicting whether the set of spatio-temporal-refined frame-level features are from an input video from the first set of video data or the second set of video data; and a global domain loss, which represents error in predicting whether the video-level feature is from an input video from the first set of video data or the second set of video data; and updating the video segmentation network using the computed losses.

15. The non-transitory computer-readable medium or media of claim 14 wherein:

the local temporal domain adaptation module further comprises a gradient reversal layer that reverses a gradient sign of the local domain loss when updating the multi-layer temporal convolution network; and the global temporal domain adaptation module further comprises a gradient reversal layer that reverse a gradient sign of the global domain loss when updating the multi-layer temporal convolution network.

16. The non-transitory computer-readable medium or media of claim 14 the video segmentation system further comprises:

a feature generator that receives the input videos and, for each input video, converts the input video into the set of frame-level features.

17. The non-transitory computer-readable medium or media of claim 14 wherein the video segmentation network further comprises:

at least one temporal convolution network stage, which comprises:

a multi-layer temporal convolution network that receives an input related to the set of frame-level features of the input video and outputs a set of spatio-temporal-refined frame-level features; and a classification layer that receives the set of spatio-temporal-refined frame-level features and outputs a set of frame-level predictions; and wherein an output of one stage is used as the input to the next stage.

18. The non-transitory computer-readable medium or media of claim 17 wherein the input related to the set of frame-level features of the input video comprises:

the set of frame-level features of the input video if the multi-layer temporal convolution network is the first the multi-layer temporal convolution network of the video segmentation network; and the set of frame-level predictions from a prior stage if the multi-layer temporal convolution network is not the first the multi-layer temporal convolution network of the video segmentation network.

19. The non-transitory computer-readable medium or media of claim 14 wherein at least one domain adaption temporal convolution network further comprises:

a domain attentive entropy component that receives the set of frame-level predictions and the domain prediction and outputs an attentive entropy loss; and wherein the step of updating the video segmentation network using the computed losses includes the attentive entropy loss.

20. The non-transitory computer-readable medium or media of claim 14 wherein, for at least one domain adaption temporal convolution network, the input related to the set of frame-level features of the input video comprises:

the set of frame-level predictions from a prior stage.

* * * * *